United States Patent [19]

Carlin et al.

[11] Patent Number: 4,838,068
[45] Date of Patent: Jun. 13, 1989

[54] METHOD OF FABRICATING THREADED CONNECTION FOR PIPES

[75] Inventors: Frank J. Carlin, Houston, Tex.; Terrell F. Wafford, Wilburton, Okla.

[73] Assignee: Baker Hughes Incorporated, Houston, Tex.

[21] Appl. No.: 218,839

[22] Filed: Jul. 14, 1988

Related U.S. Application Data

[62] Division of Ser. No. 101,653, Sep. 28, 1987, Pat. No. 4,796,928.

[51] Int. Cl.$^4$ .................. B21D 41/02; B21D 41/04; F16L 15/00
[52] U.S. Cl. .................................. 72/340; 72/367; 29/157 R
[58] Field of Search ............... 72/340, 367, 370, 393, 72/402; 29/157 R; 285/334, 333, 355, 390

[56] References Cited

U.S. PATENT DOCUMENTS

| | | | |
|---|---|---|---|
| 2,154,037 | 4/1939 | Eaton | 72/340 |
| 2,211,178 | 8/1940 | Stone | 29/157 R |
| 2,494,128 | 1/1950 | Holmquist et al. | 72/367 |
| 4,373,754 | 2/1983 | Bollfrass et al. | 285/334 |
| 4,753,460 | 6/1988 | Tung | 285/355 |

*Primary Examiner*—Daniel C. Crane
*Attorney, Agent, or Firm*—Hubbard, Thurman, Turner & Tucker

[57] ABSTRACT

The method of fabricating threaded pipe joints to eliminate variations in tensile strength produced by tolerance variations in the wall thickness of a pipe. Such tolerance variations are eliminated by cold forming and then machining the entire lengths of both the pin and box ends of the threaded pipe joint. A precise mathematical relationship between the root diameter of the threads and the wall thicknesses of the pin and box portions of the pipe eliminates the creation of critical areas having reduced tensile strength.

1 Claim, 3 Drawing Sheets

METHOD OF FABRICATING THREADED CONNECTION FOR PIPES

This is a division of application Ser. No. 101,653 filed Sept. 28, 1987 now U.S. Pat. No. 4,796,928 issued Jan. 10, 1988.

BACKGROUND OF THE INVENTION

1. Field of the Invention:

The invention relates to an improved threaded connection for oil well pipes manufactured in accordance with A.P.I. specifications, and to a method for fabricating such threaded connection.

2. Summary of the Prior Art:

Substantially all pipe utilized in oil wells, and particularly conduit elements subject to substantial amounts of tension when installed in the well, such as casing pipe, are fabricated to comply with American Petroleum Institute (A.P.I.) specifications. Such specifications involve a significant range of dimensional tolerances both for the internal diameter of the pipe and the external diameter. Many oil well drillers prefer that the threaded connection between the successive lengths of pipe be of the so-called flush configuration which inherently limits the amount of metal available for cutting threads on the pin end of one pipe and in the box end of the connecting pipe.

To improve the efficiency of such threaded connections, and particularly the resistance of the threaded connections to applied tension, so-called premium threads have been developed, such as the BAKER RSS Premium Thread currently sold by BAKER TUBULAR SERVICES, INC. of Houston, Texas. Such premium threads involve so-called two step threads, in other words two sets of axially adjacent threads with the outermost set on the pin being of substantially smaller diameter than the innermost set of threads on the pin. Metal seals are provided by conical surfaces at opposite ends of the threaded connection and it is common to provide a reverse angle torque stop surface intermediate the two axially adjacent threads.

When such threads are fabricated by conventional machining practices, a substantial variation in the tension resistance of the threaded joint was observed. Extensive tests uncovered the fact that the variance was caused by the A.P.I. tolerance on the OD and ID of the pipe. These variations as allowed by A.P.I. tolerances, could produce as much as a twelve percent reduction in the critical areas of the two step threaded connections. Thus, random failures were repeatedly encountered in the field when conventionally formed two step threads were employed in pipe strings requiring substantial tensile strength of the threaded joints, preferably a minimum of seventy percent of the ultimate tensile strength of the pipe wall. Accordingly, there is room for substantial improvement in the reliability of threaded connections for effecting two step flush joints of pipes manufactured in accordance with A.P.I. specifications.

SUMMARY OF THE INVENTION

The invention provides an improved threaded connection for pipe manufactured in accordance with A.P.I. specifications, and a method for fabricating such improved threaded connection. The improved threaded connection can best be understood by describing the new method for fabricating the threaded connection.

Assuming that a flush connection having a two step thread is desired, the pin end of the pipe is first swaged to radially inwardly compress the entire pin end of the pipe, which includes both steps of the threads to be ultimately formed. Such swaging produces a reduction in internal diameter of the pin end of the pipe to a dimension less than the "drift" specification dimension of the pipe. Those skilled in the art will understand that the "drift" dimension refers to the internal diameter of the pipe which is required to permit the free passage of a plug-type gauge or drift through the bore of the pipe.

In the next step of the new method, the internal diameter of the pin portion of the pipe is machined to a dimension which exceeds the drift dimension by 0.001 to 0.003 inches. Thus, the conformance of the threaded joint to the A.P.I. drift specifications is assured.

The two step threads are then machined into the exterior of the pin portion. Such threads are axially adjacent and incorporate conventional conical sealing surfaces at the innermost and outermost ends of the two step thread. Intermediate the two axially adjacent thread sections, a reverse angle torque stop surface may be provided, as is conventional. The root diameters of both steps of the two step thread are proportioned in accordance with a formula which will be hereinafter explained.

To fabricate the cooperating threads in the box end of the threaded connection, such box end is first swelled by the utilization of conventional cold forming techniques to expand the outside diameter of the entire box section to a dimension exceeding the maximum A.P.I. specification dimension for the particular size and weight of pipe. The swelled outer diameter of the box section is then machined to conform to the A.P.I. specification dimension within a tolerance range of +0.000 inches −0.002 inches. The two axially adjacent threaded sections are then machined in the interior of the expanded box section and the threads are dimensioned to cooperate with the external threads on the pin section. Cooperating conical sealing surfaces are provided at both ends of the two step box threads and a reverse angle torque stop surface is provided intermediate the two thread steps. These surfaces cooperate with the similar surfaces on the pin when the two step threads are fully engaged.

In accordance with this invention, the root diameter of the threads in both steps are dimensioned so as to eliminate the occurrence of a critical cross section in any one of the cooperating threaded sections. This is accomplished by maintaining the following relationship:

$$P1 = B1 = A1 + A2,$$

where P1 is the root diameter of the large diameter thread on the pin end of the pipe; B1 is the difference between the root diameter of the small diameter thread in the box end of the pipe and the machined outer diameter of the box end; A1 is the difference between the root diameter of the large diameter thread in the box end of the pipe and the machined outer diameter of the box end, and A2 is the difference between the root diameter of the large diameter thread on the pin end of the pipe and the machined inner diameter of the pin end.

When this relationship is maintained, there is no critical area weaker than all other areas within the two step pin and box threaded connection, irrespective of tolerance variations of the connected pipes. With this relationship, a desired tensile efficiency of seventy percent can be readily maintained for all threaded connections, and thus the entire pipe string can be guaranteed to provide a minimum level of seventy percent of the tensile strength of the specified pipe wall.

Of equal importance is the fact that the threaded connection provided for each size and weight of pipe is custom designed for that particular size and weight of pipe. In other words, each size and each weight of pipe has customized two step threads on its pin and box ends to maximize the tensile efficiency of the threaded joints of the resulting pipe string. A threaded joint efficiency of seventy percent of the pipe wall strength in tension can be readily maintained and guaranteed.

Further advantages of the invention will be readily apparent to those skilled in the art from the following detailed description, taken in conjunction with the annexed sheets of drawings, on which is shown a preferred embodiment of the invention.

DESCRIPTION OF PREFERRED EMBODIMENTS

Figure 1:
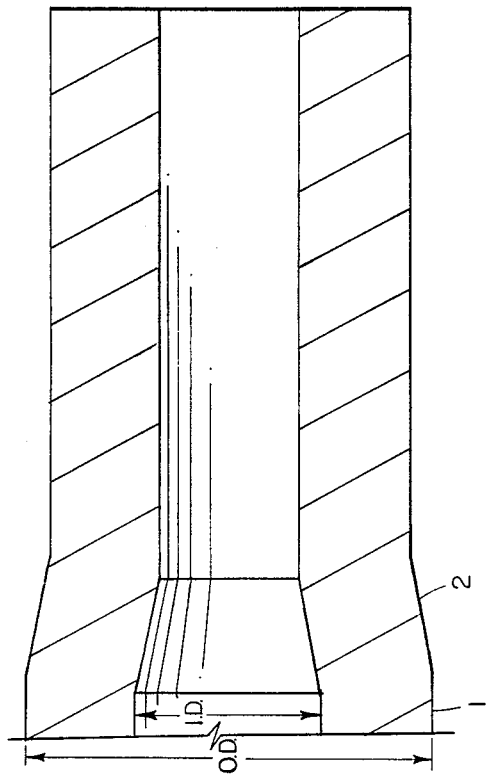
FIG. 1 is a diametral sectional view of the pin end of a length of well pipe which has been swaged to a reduced internal diameter.

Referring to FIG. 1, there is shown a conventional pin end of a length of well pipe fabricated in accordance with A.P.I. specifications. Pipe 1 has an inner diameter designated by the dimension ID which has a dimension and tolerance which varies for each size and weight of pipe, as set forth in A.P.I. specifications. Similarily, the outer diameter, designated OD, has a dimension and tolerance set forth to the A.P.I. specification for each size and weight of pipe. In any case, if the particular pipe has an ID equal to the maximum internal diameter permitted by the A.P.I. specification, and an OD which is at the minimum dimension permitted by the A.P.I. specification, it inherently follows that the wall thickness of pipe 1 will be at a minimum, yet will lie within the A.P.I. specification. Conversely, a length of pipe having an ID of minimum of dimension permitted by the A.P.I. specification and an OD of maximum dimension permitted by the A.P.I. specification will have a substantially greater wall thickness. When identical threads are machined on the exterior of the pin end, obviously the pin end having the greatest wall thickness will have substantially greater strength than the pin end having the minimum wall thickness. A similar variation is encountered in threads formed in the cooperating box end of another pipe forming threaded joint. This accounts for the random pattern of tension failure of threaded joints fabricated in pipe lengths conforming to A.P.I. specifications.

Figure 2:
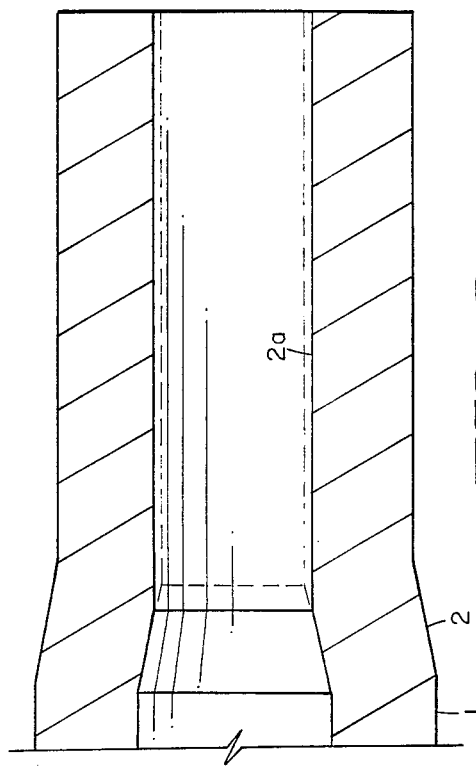
FIG. 2 shows the pin end of the pipe of FIG. 1 after it is subjected to a machining operation to increase the internal diameter to exceed the drift specification.

In accordance with the method of this invention, the pin end portion 1 of the pipe is subjected to a swaging operation to produce an inward displacement of the metal wall of the entire pin end portion as shown in dimensionally exaggerated form by FIG. 2. The swaging is performed by conventional cold forming methods to effect a reduction in the ID of the swaged pin end 2 to a dimension which is less than the drift dimension specified for the particular pipe.

The next step in the forming method of this invention, illustrated in FIG. 2, is the machining of the ID of the swaged pin end 2 of the length of well pipe 1 to an internal dimension which is from 0.001 to 0.003 inches less than the specified drift dimension for the pipe. Such machining is indicated by the surface 2a.

Figure 3:
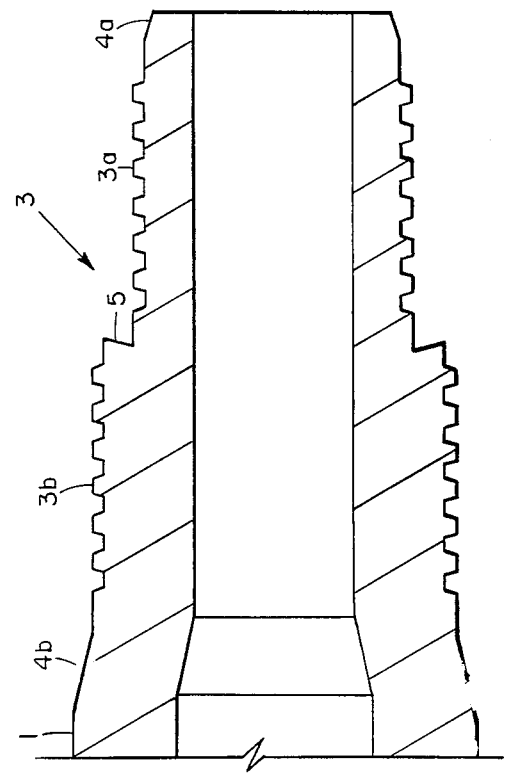
FIG. 3 is a diametral sectional view of the pin end of the pipe following the machining of a two step thread on the exterior of the pin portion.

The desired two step thread 3 is then machined into the external diameter portion of the pin end 2 which overlies the machined cylindrical internal surface 2a, as shown in FIG. 3. Such two step thread comprises the axially adjacent threaded sections 3a and 3b. Outer section 3a has a substantially smaller pitch diameter than the inner threaded section 3b. Adjacent the outer end of outer threaded section 3a, a conical sealing surface 4a is provided and a similar conical sealing surface 4b is provided adjacent the extreme inner end of the inner threaded section 3b. These conical surfaces cooperate with mating surfaces provided in the box end of the length of pipe to be connected to the two step threads 3, to form metal to metal seals, as will be described. Intermediate the outer threaded section 3a and the inner threaded section 3b, a reverse angle torque stop surface 5 may be provided for cooperation with a similarily shaped surface provided in the cooperating box.

From the foregoing description, it will, however, be apparent that the wall thickness of the pin portion 2 lying between the root diameter of the threaded sections 3a and 3b and the machined internal bore surface 2a is the maximum permitted by the A.P.I. specifications.

Figure 4:
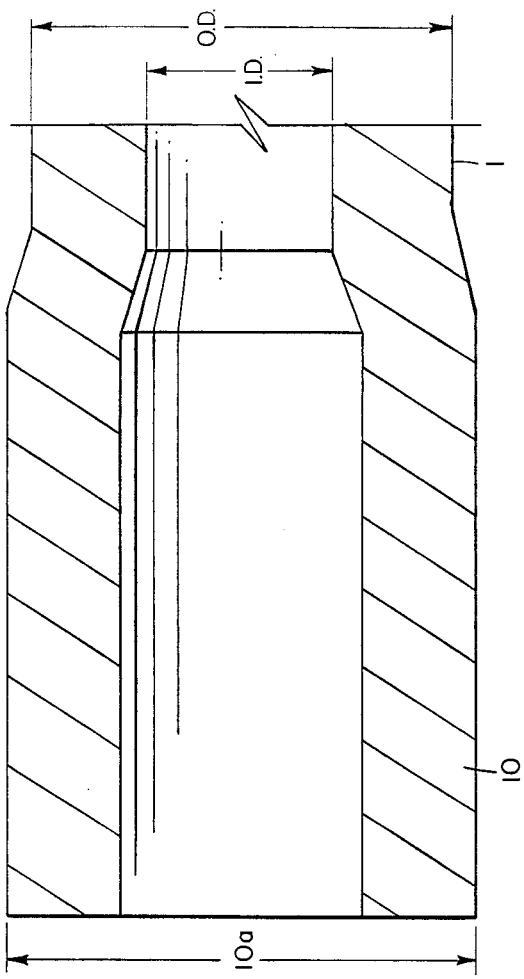
FIG. 4 is a diametral sectional view of the box end of length of well pipe which has been expanded to a dimension exceeding the maximum A.P.I. specification.
Figure 5:
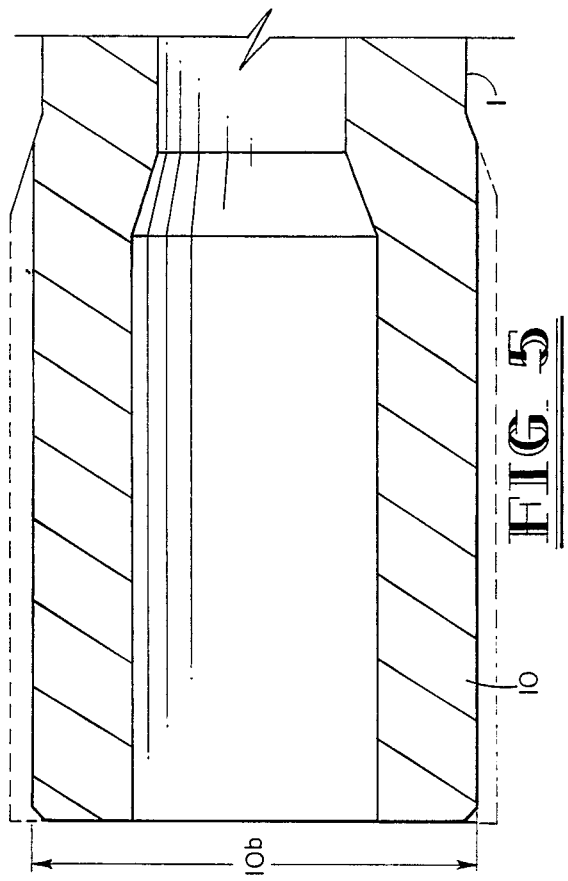
FIG. 5 shows the box end of the pipe section of FIG. 4 after machining of the external diameter of the pipe to a dimension conforming to the maximum dimension permitted by the A.P.I. specification.

Turning now to FIG. 4, there is shown a box end 10 of a pipe length 1 which is also formed in accordance with the method of this invention. As exaggeratedly shown in FIG. 4, the box end 10 has been swelled by a conventional cold forming operation to an outer diameter 10a exceeding the maximum dimension permitted by the applicable A.P.I. specification. This swelled outer diameter portion 10a is then machined as indicated in FIG. 5 to produce a machined outer diameter 10b equal to the maximum dimension permitted by the A.P.I. specification with a tolerance of +0.000 inches minus 0.002 inches. It is therefore assured that the maximum diameter of the pipe section 1 will not exceed the applicable A.P.I. specification and also, that a substantially flush joint will be achieved when the box end 10 is threadably engaged with the pin end 2.

Figure 6:
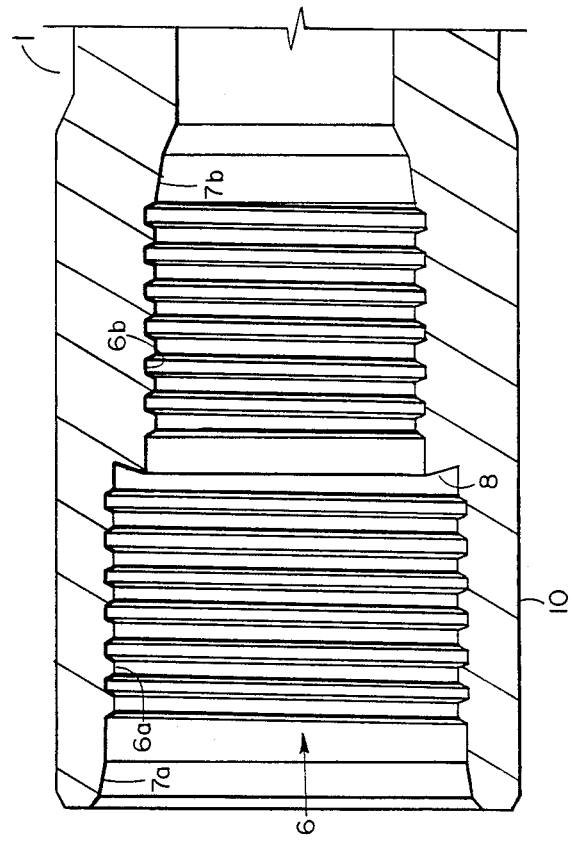
FIG. 6 is a view similar to FIG. 5 but showing the machining of the two step threads within the bore of the box end of the pipe of FIG. 5.

Referring now to FIG. 6, the finished box end 10 is shown with the two step threads 6 machined therein. The outer threaded section 6a has a substantially larger pitch diameter than the inner threaded section 6b. Conical sealing surfaces 7a and 7b are provided respectively adjacent the outer end of the outer thread section 6a and adjacent the inner end of the inner thread section 6b.

These conical sealing surfaces respectively cooperate with the conical sealing surfaces 4b and 4a provided on the machined pin portion 2. Additionally, a reverse angle torque stop surface 8 is provided intermediate the adjacent threaded sections 6a and 6b and cooperates with the torque stop surface 5 provided on the pin end 2 of the pipe 1.

As in the case of the pin section, the method of this invention involves the initial cold forming of the box end of the pipe so that the OD of such box section exceeds the applicable A.P.I. specification, following which the OD is reduced by machining to a level substantially equal or slightly less than the applicable A.P.I. specification. It is thus assured that a maximum wall thickness is provided in the box portion of the pipe 1 for the machining of the two step thread 6 therein.

A further feature of this invention is the design of a relationship between the pin threads and box threads so that no critical area appears in any threaded section of either the box or pin threads. This relationship is accomplished by designing the cooperating pin threads 3a and 3b and the box threads 6a and 6b in accordance with the following formula:

$$P1 = B1 = A1 + A2.$$

In this formula P1 is the root diameter of the large diameter thread 3b formed on the pin end of the pipe. B1 is the difference between the root diameter of the small diameter thread 6b in the box end of the pipe and the machined outer diameter 10b of the box end. A1 is the difference between the root diameter of the large diameter thread 4a in the box end of the pipe and the machined outer diameter 10b of the box end. Lastly, A2 is the difference between the root diameter of the large diameter thread 3b formed on the pin end and the machined inner diameter 2b of the pin end. With this relationship between the pin and box threads, there is no individual critical area where failure under tension would be more likely to occur. Hence, the opportunity for random failures of the threaded pipe joints under tension conditions has been further significantly reduced.

The above described threaded connections were subjected to an extensive testing program to corroborate its anticipated theorhetical advantages. A summary of such tests follows:

A. BURP TEST. This test was done to determine the necessity of hooked (negative load flank) threads to prevent jump-out. The jump-out theory states that if the thread annulus is exposed to internal pressure, this pressure will expand the box to an extent that the pin and box threads will disengage causing the connection to separate. Hooked threads supposedly radially lock the pin and box together to prevent this. For this test, the pin was drilled, in a radial direction, so that the internal pressure was exposed directly to the external seal. The test sample was then assembled and installed into a pull test frame. After reaching the yield load of the connection, the internal pressure was steadily increased. At about 2,000 psi internal pressure, the external seal began slowly leaking. At no time was there any indication of connection failure.

B. COEFFICIENT OF FRICTION. These experiments were done to determine the coefficient of friction for steel threads against steel threads lubricated with API modified pipe dope. With this information, the proper make-up torques can be calculated. The test apparatus consisted of a string of joints and adapters that were installed in the pull test frame. The middle joint was loose, about 2 turns from make-up. A tension was applied to the string. A pipe wrench was applied to the loose middle joint and a measured force applied to the end of the wrench. The known torque and axial load were then used to calculate the coefficient of friction for those conditions.

C. TENSION. The purpose of these tests was to determine the effects of axial tension on the connection. Six samples were tested. The last one was instrumented with strain gages. The samples were simply pulled until failure occurred. Failure occurred at 5.7 to 10 percent above the predicted load.

D. REPEATED MAKE-UP/BREAK-OUT. In this experiment, two samples were repeatedly made-up to normal torque and broken out to observe the effects of multiple make-ups on the connection. The first specimen was not redoped after such break-out and galled badly after only 10 cycles. The second specimen was redoped after each break-out and measured (pin nose I.D. and box nose O.D.) after every 10 make-ups, for a total of 50 cycles. No appreciable wear and no set in diameters was observed.

E. BURST. The effects of internal pressure on the connection were studied in this series of tests. The specimens were capped and installed in the pull test frame. A compressive load equal to the tension induced by the internal pressure was applied to the sample at all times. The internal pressure was then increased until failure of the sample. During testing of the second and third samples, the internal pressure was released after each step and the box O.D. measured to detect permanent set of the connection. The three samples leaked through the connection at 14,950, 15,250, and 16,150 psi. The API internal yield (burst) pressure for this actual size, weight, and grade casing is 12,950 psi.

F. COLLAPSE. The collapse tests were done to observe the effects of external pressure on the connection. Four specimens were tested. In the first test, the specimen halves were assembled into a sleeve-like gland which was sealed to the casing OD with O-rings. The pressure in the gland, and, therefore, the pressure to which the outside of the connection was exposed, was increased in steps until one of the gland O-rings burst out at 14,050 (the external seal was still holding at this pressure). After each step of pressure increase, the gland pressure was released and the pin ID measured to detect any permanent set of the connection. For the second test, two one inch thick disks were inserted into the test sample bore to a point where they could support the casing opposite the gland O-rings and, hopefully, keep the O-rings from blowing out. The gland pressure was increased to 12,900 psi when one of the O-rings blew out. For the third test, a new, thicker walled gland was fabricated. The gland pressure was increased to 25,900 psi when the test was teminated. Water was found inside the connection indicating that the seal had leaked at sometime during the test. The procedure for the last test was to increase the gland pressure in steps of 1,000 psi and then stop the pump before going on to the next step. If no drop in pressure was observed, then there was no leak. The connection began leaking at 17,650 psi. (This should be taken as the representative collapse test pressure limit for 5"×18#, 88,600 psi yield strength casing).

G. COMBINED TENSION AND BURST. This test series was performed to determine the effects of combined axial tension and internal pressure. The samples for these tests were prepared identically to those of the burst tests. They were then installed into the pull test frame and an axial tension was applied. An increasing internal pressure was then applied while the tension was reduced in an amount equal to the tension induced by the internal pressure. The internal pressure was increased in this manner until failure. The box nose OD was instrumented with strain gages and the overall connection length was constantly measured by an extensometer to get an approximation of the yield point of the connection. See FIG. 7.

H. COMBINED TENSION AND COLLAPSE. In these two tests, the samples, identical to those of Section F, above, were instrumented with strain gages on the pin nose ID and then installed into the pull test frame. An axial tension was applied to the specimen and then an increasing external pressure was applied to the connection until failure. See FIG. 7.

I. SERVICE TEST. Each of these three tests consisted of combined and serial loadings in an effort to simulate actual field usage. In test A, the connection was subjected to 322,000 pounds axial compression (100% of axial tension yield) followed by 281,000 pounds axial tension (87% yield). The internal pressure was then increased to 2880 psi which brought the total effective tension to 323,100 pounds, about 100% yeild. Then the tension and internal pressure were adjusted in steps to keep the effective tension at 100% yield while increasing the burst pressure to 11,520 psi, 100% of the API internal yield pressure for this sample. The box OD was instrumented with strain gages. Test B was a composite of Shell Oil Co. Test 3.3.5 and 3.3.6, a multitude of combinations of axial tension, axial compression and internal pressure. In test C, a combination burst/collape sample was first subjected to a combination of 14,690 psi burst pressure and 203,000 pounds axial tension (100% effective tension yield and 100% internal yield pressure) and held for 10 minutes. The tensile and burst loads were released and then replaced by 14,300 psi external pressure which was held for 30 minutes. After the collapse pressure was bled off, 14,680 psi internal pressure combined with 201,000 pounds axial tension were applied and held for 20 minutes. All of these tests were completed without any leakage or separation.

J. VON MISES ULTIMATE ELLIPSE. This experiment took data from the Tension, Burst, Collapse, Tension and Burst, and Tension and Collapse test and plotted them on a graph. The resulting plot allows the string designer to determine safe combinations of tension and internal pressure or tension and external pressure. See FIG. 7.

Figure 7:
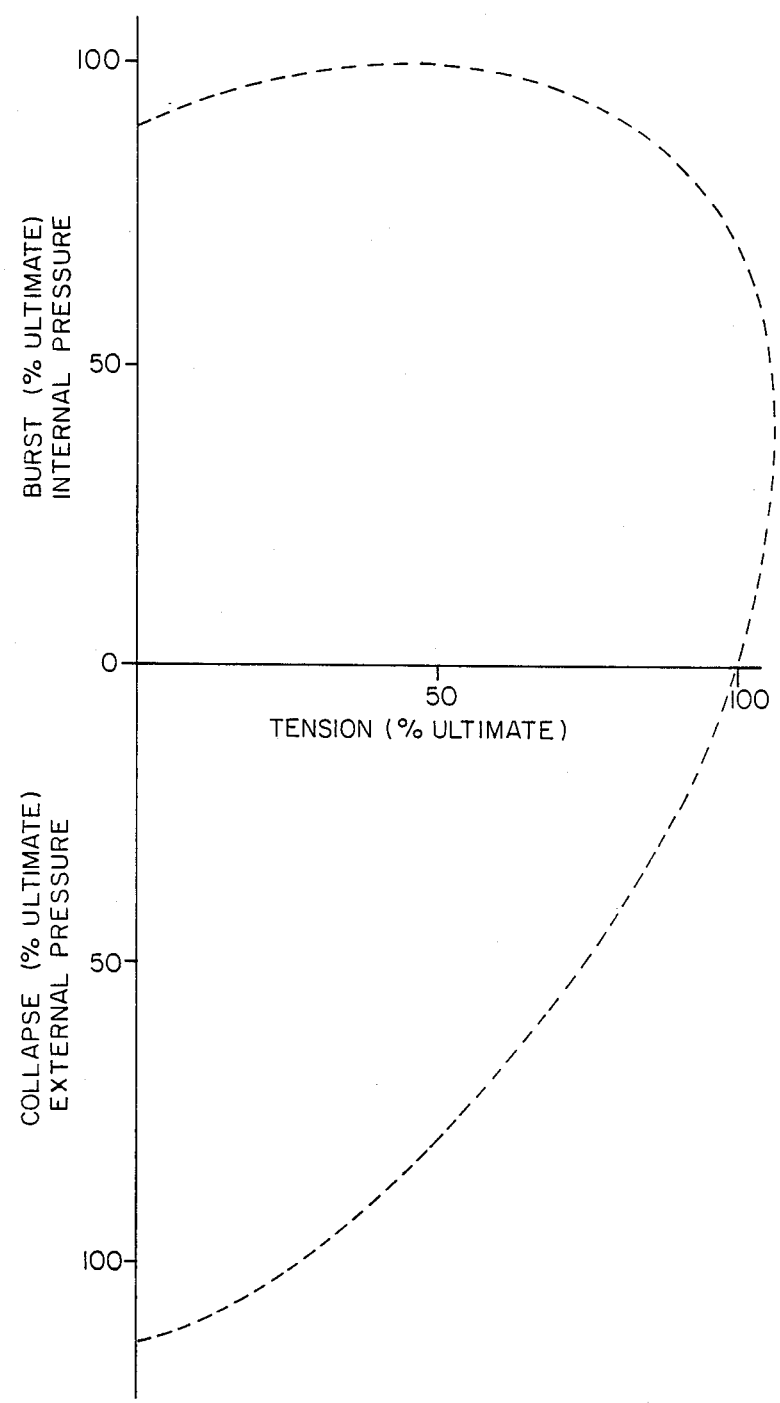
FIG. 7 is a Von Mises graph of data collected from testing pipe connections embodying this invention.

By reference to the chart of results of the tests shown in FIG. 7, it will be readily apparent to those skilled in the art that a two step threaded flush joint connection for well pipe embodying this invention produces consistently superior results over prior art connections.

Although the invention has been described in terms of specified embodiments which are set forth in detail, it should be understood that this is by illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed and desired to be secured by Letters Patent is:

1. The method of fabricating threaded ends on pipe produced to A.P.I. specifications, one pipe end constituting a pin and the other pipe end a box, and each threaded end comprising two axially spaced threads respectively having a large pitch diameter and a small pitch diameter, comprising the steps of:

swaging the entire pin end of the pipe inwardly to produce an internal diameter less than the drift diameter of the pipe;

machining the inner diameter of the entire swaged portion of the pin end to a diameter from "0.001 to 0.003" greater than said drift diameter;

machining said two axially spaced threads on the exterior of said machined inner diameter portion of said pin end;

swelling the entire box end of the pipe outwardly to a diameter in excess of the max A.P.I. outer diameter specified for the pipe;

machining the swelled box end to a dimension corresponding to said max A.P.I. outer diameter plus 0.000 "and minus 0.002"; and machining said two axially spaced threads in the interior of said machined outer diameter portion of said box end, said axially spaced threads in said pin and box ends being complemental and respectively engagable with identical axially spaced threads formed on box and pin ends of other pipes; said axially spaced threads in said pin and box ends being machined in accordance with the following dimensional relationship:

$$P1 = B1 = A1 + A2;$$

where P1 is the root diameter of the large diameter thread on the pin end of the pipe; B1 is the difference between the root diameter of the small diameter thread in the box end of the pipe and said machined outer diameter of said box end; A1 is the difference between the root diameter of said large diameter thread in said box end of the pipe and said machined outer diameter of said box end; and A2 is the difference between the root diameter of the large diameter thread on said pin end and said machined inner diameter of said pin end.

* * * * *